United States Patent
Douglas et al.

(10) Patent No.: US 8,175,781 B2
(45) Date of Patent: May 8, 2012

(54) TORQUE CONVERTER CONTROL FOR VARIABLE VALVE LIFT POWERTRAIN SYSTEMS

(75) Inventors: Scot A. Douglas, Canton, MI (US); Donovan L. Dibble, Utica, MI (US)

(73) Assignee: GM Global Technology Operations LLC

( * ) Notice: Subject to any disclaimer, the term of this patent is extended or adjusted under 35 U.S.C. 154(b) by 419 days.

(21) Appl. No.: 12/486,201

(22) Filed: Jun. 17, 2009

(65) Prior Publication Data
US 2010/0324794 A1 Dec. 23, 2010

(51) Int. Cl.
*B60K 23/02* (2006.01)
*B60W 10/02* (2006.01)

(52) U.S. Cl. ......... 701/68; 477/70; 477/174; 192/52.4; 192/3.51

(58) Field of Classification Search ............ 701/68; 477/70, 174; 192/3.51, 52.4; B60W 10/02; B60K 23/02
See application file for complete search history.

(56) References Cited

U.S. PATENT DOCUMENTS

| | | | |
|---|---|---|---|
| 4,416,358 A | 11/1983 | Kapp | |
| 4,986,227 A | 1/1991 | Dewey, III | |
| 5,036,963 A * | 8/1991 | Murata | 192/35 |
| 5,058,716 A * | 10/1991 | Lippe et al. | 192/3.33 |
| 5,569,117 A * | 10/1996 | Kono et al. | 477/169 |
| 5,613,583 A * | 3/1997 | Kono et al. | 192/3.31 |
| 5,871,419 A * | 2/1999 | Amendt | 477/180 |
| 6,188,943 B1 * | 2/2001 | Uchida et al. | 701/54 |
| 6,679,133 B1 * | 1/2004 | Kayano et al. | 74/335 |
| 6,863,048 B2 | 3/2005 | Burkhard et al. | |
| 7,346,442 B2 | 3/2008 | Higashimata et al. | |
| 7,361,120 B2 | 4/2008 | Iida et al. | |
| 7,444,236 B2 | 10/2008 | Wiles | |
| 7,458,348 B2 | 12/2008 | Machida et al. | |
| 2001/0027689 A1 * | 10/2001 | Kayano et al. | 74/11 |
| 2004/0224820 A1 * | 11/2004 | Matsumura et al. | 477/107 |
| 2011/0004380 A1 * | 1/2011 | Kojima et al. | 701/53 |

OTHER PUBLICATIONS

U.S. Appl. No. 11/769,797, filed Jun. 28, 2007, Michael Livshiz.

* cited by examiner

*Primary Examiner* — Mark Hellner
*Assistant Examiner* — Ari M Diacou

(57) ABSTRACT

A control system for a powertrain of a vehicle includes a torque module and a damping control module. The torque module determines a first output torque and a second output torque of the engine. The second output torque is determined after the first output torque. The torque module also determines a torque difference based on the first output torque and the second output torque. The damping control module generates a damping torque in a transmission based on the torque difference.

20 Claims, 5 Drawing Sheets

TORQUE CONVERTER CONTROL FOR VARIABLE VALVE LIFT POWERTRAIN SYSTEMS

FIELD

The present invention relates to torque output control of variable valve lift powertrain systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) is powered by combustion energy generated in cylinders of the ICE. The cylinders have respective intake and exhaust valves. An air/fuel mixture may be received through the intake valves, and exhaust gas is removed from the cylinders through exhaust valves. The intake and exhaust valves may be actuated by cams on a camshaft. The camshaft may be driven by a crankshaft via one or more timing belts, gears and/or chains. The cams open the intake and exhaust valves at respective angular displacements of the camshaft during intake and exhaust strokes. The opening of a valve may include the lifting of a valve away from a cylinder, referred to as valve lift. The amount of time that a valve is opened is referred to as valve lift duration.

Extent of valve lift and valve lift duration may be based on a cam profile. The cam profile, characterized by contour shape and angular position relative to a camshaft, may be designed for a particular engine operating at a particular engine speed. Once the cam profile is determined and the engine is assembled, the cam profile may be used for all engine operating speeds.

A fixed cam profile may provide limited performance for speeds other than the particular engine speed for which the fixed cam profile was designed. Since a cam opens intakes valves based on angular displacement of a camshaft, duration of intake valve opening can be reduced as speed of the camshaft increases. The reduced duration in intake valve opening can negatively affect engine performance. For example, an engine may need an increased amount of air when operating at an increased engine speed. For the stated reasons, a fixed cam profile that is designed for a engine speed range may not provide sufficient valve opening or lift to allow a requested amount of air to be fully received when an engine speed is greater than the engine speed range.

Variable valve lift (VVL) control systems allow multiple cam profiles to be selected to actuate intake and exhaust valves. The VVL control system may provide a larger amount of valve lift at higher engine speeds than at lower engine speeds by applying different cam profiles. Variable valve lift control can improve engine performance including increased efficiency and reduced emissions.

SUMMARY

In one embodiment, a control system for a powertrain of a vehicle is provided and includes a torque module and a damping control module. The torque module determines a first output torque and a second output torque of the engine. The second output torque is determined after the first output torque. The torque module also determines a torque difference based on the first output torque and the second output torque. The damping control module generates a damping torque in a transmission based on the torque difference.

In other features, a control system for a powertrain of a vehicle is provided. The control system includes a time module, a torque module and a damping control module. The time module detects a transition from a first lift state to a second lift state of a valve of an engine of the vehicle. The torque module determines a torque difference based on the transition. The damping control module detects a state of a clutch in a transmission. The clutch operates in one a locked state and a slip state. The damping control module changes the state of the clutch to the slip state based on the torque difference when the state of the clutch is the locked state.

In other features, a control system of operating a powertrain system is provided. The control system includes a first module that detects a transition of valve lift state of an engine from a first lift state to a second lift state. The system includes a second module that determines a torque difference based on the change. The system includes a third module that detects a state of a clutch of a transmission. The state of the clutch includes a locked state and a slip state. The third module changes the state to a slip state based on the torque difference when the state is a locked state.

In other features, a method of operating a powertrain system is included. The method includes detection of a transition from a first lift state to a second lift state of a valve of an engine. A torque difference is determined based on the transition. A state of a clutch in a transmission is detected. The clutch operates in one of a locked state and a slip state. The clutch is slipped based on the torque difference when the clutch is in the locked state.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
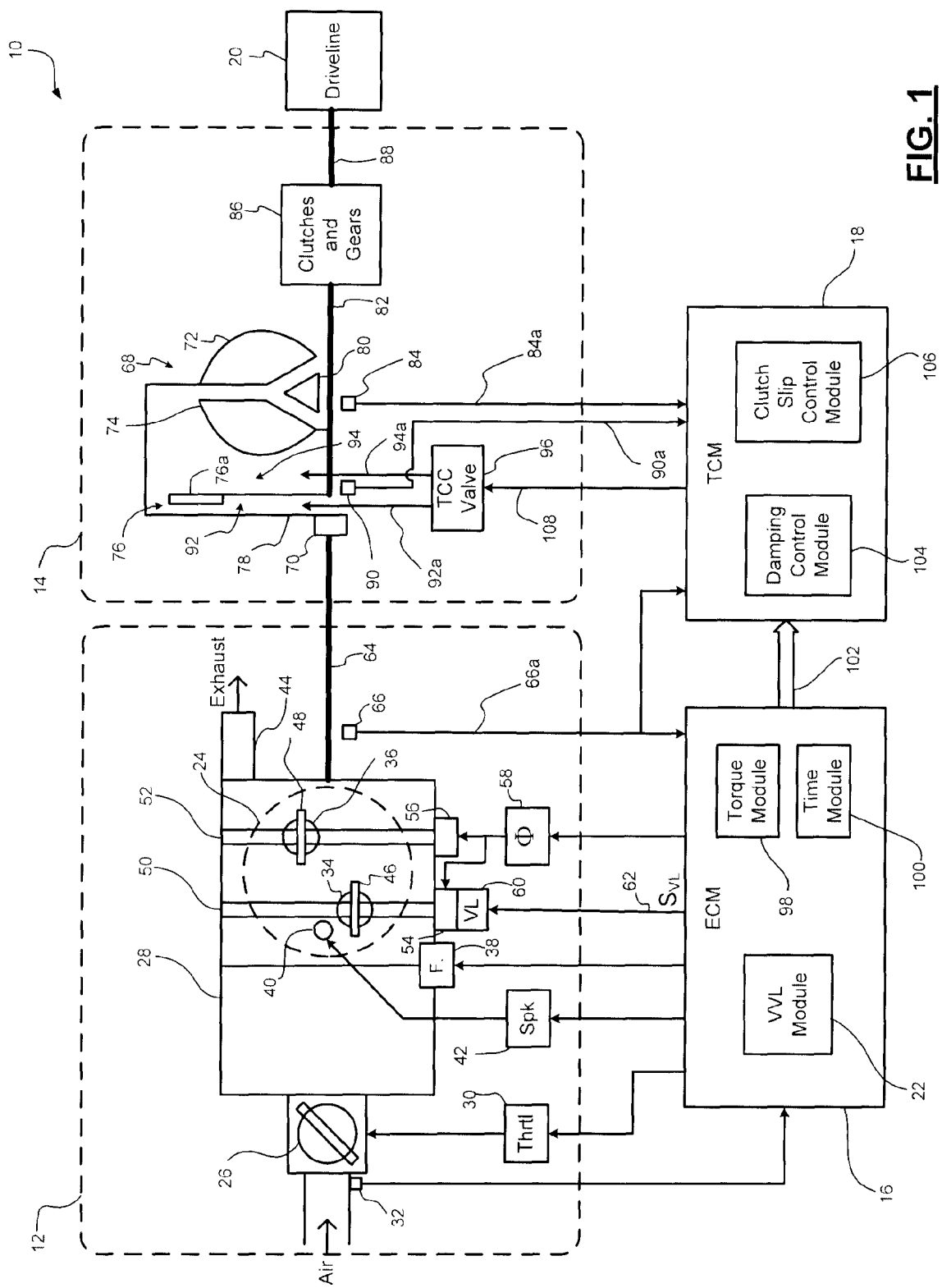
FIG. 1 is a functional block diagram of a powertrain control system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Variable valve lift control may include a two-step or multi-step valve lift mechanism with multiple distinct cam profiles for opening a valve. Each cam profile may be associated with a respective valve lift state. A first valve lift state may be used for engine speeds greater than a predetermined engine speed. A second valve lift state may be used for engine speeds less than a predetermined engine speed. The first valve lift state may be associated with a higher lift than the second valve lift state. Engine torque output may change during transitions between the first and second valve lift states. The change in engine torque may be referred to as a torque transient. The torque transient may be associated an unscheduled variation in vehicle acceleration. The following disclosed embodiments minimize torque transients due to transitions between lift states.

Referring now to FIG. 1, a powertrain control system of a vehicle is shown. The powertrain control system 10 includes an engine 12, a transmission 14, an engine control module (ECM) 16 and a transmission control module (TCM) 18. The control system 10 may also include a driveline 20 that drives the motor vehicle. The engine 12 may generate a torque to propel the vehicle via the driveline 20. The torque is transmitted via the transmission 14 to drive the driveline 20. The ECM 16 may include a VVL module 22 that provides a multiple number of valve lift states for engine operation in various speed ranges. A first valve lift state may be used when engine speed is greater than a predetermined speed threshold. A second valve lift state may be used when the engine speed is less than the speed threshold.

At transitions between the first and second valve lift states, a corresponding change of engine output torque may occur. The corresponding change of engine output torque may be referred to as torque transient. The torque transient may cause an unscheduled variation of vehicle acceleration. Presence of the variation of vehicle acceleration may not have adverse effect in vehicle performance. The ECM 16 and the TCM 18 may generate control signals to the transmission 14 to provide a damping torque in the transmission 14 to reduce the torque transient. The damping torque may reduce or eliminate the variation of vehicle acceleration. The control signals may include slipping a clutch in the transmission 14.

The engine 12 includes a cylinder 24 and a throttle 26. Air is drawn into an intake manifold 28 through the throttle 26. The throttle 26 may be controlled by a throttle actuator 30 in response to a command signal from, for example, an accelerator pedal (not shown). A throttle position sensor 32 may be used for closed-loop control of throttle position. The engine 12 may include any number of cylinders. For illustrative purpose only one cylinder is shown.

The cylinder 24 may have one or more intake valve(s) 34 and exhaust valve(s) 36. Air may be drawn into the cylinder 24 through the intake valve 34. Fuel may be provided via a fuel actuator 38, for example, a fuel injector, to create an air/fuel mixture. The fuel may be injected into the intake manifold 28 or directly into the cylinder 24. The air/fuel mixture may be ignited in the cylinder 24 during an ignition stroke by a spark plug 40 that is controlled by a spark actuator 42. Engine torque is produced as a result of combustion of the air/fuel mixture. Exhaust gas is removed from the cylinder 24 through an exhaust valve 36, and then from the engine 12 through an exhaust system 44.

The intake and exhaust valves may be actuated by one or more intake and exhaust cams 46, 48. The cams 46, 48 open the intake and exhaust valves 34, 36 and have corresponding "valve lift". The intake and exhaust valves 34, 36 are in a lifted state for a determined amount of time, referred to as "valve lift duration" during each intake and exhaust cycle, respectively. The valve lift duration may be determined based on engine speed and a predetermined angular displacement of a camshaft. The intake cam 46 may be driven by an intake camshaft 50, and the exhaust cam 48 may be driven by an exhaust camshaft 52. The intake and exhaust valves 34, 36 may also be actuated by electric solenoids. The intake and exhaust cams 130, 132 may be driven by respective electric motors.

Timing of intake and exhaust valve opening and closing may be adjusted by one or more camshaft phaser(s). Intake valve timing may be adjusted by an intake camshaft phaser 54, and exhaust valve timing may be adjusted by an exhaust camshaft phaser 56. The camshaft phasers 54, 56 may be controlled by a camshaft phaser actuator 58.

Extent of valve lift and length of valve lift duration may be determined by a cam profile. The cam profile, characterized by angular position and contour shape on a camshaft, may be designed for yielding a maximum performance level at a predetermined engine speed. For example, one cam profile may be designed for maximum engine torque at engine speed N1, and another cam profile may be designed for minimal fuel consumption at engine speed N2. The intake cam 46 may have more than one fixed profile for actuating the intake valve 34. The exhaust cam 48 may have more than one fixed profile for actuating the exhaust valve 36.

In one embodiment, the intake cam 46 and exhaust cam 48 may each have multiple profiles. Each profile may be associated with a corresponding valve lift state in engine control. For illustrative purposes only, the intake cam 46 has a first profile associated with a first valve lift state $S_I$ and a second profile associated with a second valve lift state $S_{II}$. The first and second profiles may be applied for opening the intake valve 34. A valve lift state command signal $S_{VL}$ (62) may be generated to provide a cam profile for determined valve lift and valve lift duration. The first lift state $S_I$ may provide a maximum engine torque at engine speed N1, the second lift state $S_{II}$ may provide a minimal amount of fuel consumption at engine speed N2.

The engine may include a crankshaft 64. The engine may also include an engine speed sensor 66 that generates an engine speed signal ($\omega_E$) 66a by detecting a rotational speed of the crankshaft 64. The crankshaft 64 is connected to a drive train including a transmission 14.

The transmission 14 may include a torque converter 68. The crankshaft 64 of the engine 12 may be connected to the torque converter 68 at a hub 70 of the torque converter 68. The torque converter 68 may include a pump 72, a turbine 74 and a torque converter clutch (TCC) 76. The pump 72 is connected to the crankshaft 64 via a housing 78 and the hub 70 of the torque converter 68. The pump 72 may be hydraulically coupled with the turbine 74 through a stator 80. The turbine 74 is connected to an input shaft 82 of the transmission 14. The TCC 76 is also connected to the input shaft 82. Therefore, the turbine 74 is connected to the TCC 76. The transmission may include a speed sensor 84 that detects a speed of the input shaft 82. Since the input shaft 82 is connected to the turbine 74, the speed sensor 84 may generate a turbine speed signal ($\omega_T$) 84a. The speed sensor 84 may be referred to as turbine speed sensor.

The input shaft 82 drives a set of range clutches and gears 86 inside the transmission 14. The range clutches and gears 86 provide gear ratios for each determined gear range of transmission operation. A transmission output shaft 88 connects the transmission 14 to a driveline of the vehicle. Torque generated by the engine 12 is transmitted via the transmission 14 to a driveline. The vehicle may be accelerated according to the torque generated by the engine. When there is an unscheduled change in the torque production of the engine, the change may also be transmitted to the driveline. An unscheduled variation in vehicle acceleration may result.

The TCC 76 may have two or more states including LOCKED and SLIP. A clutch plate 76a of the TCC 76 is operatively connected with the housing 78 of the torque converter 68 when the TCC 76 is LOCKED. The crankshaft 64, pump 72, turbine 74 and input shaft 82 are connected together and operate as one single unit when the TCC 76 is LOCKED. The TCC 76 may be slipping when in a SLIP state. The transmission 14 may include a TCC state sensor 90 that detects the state $S_{TCC}$ of the TCC 76. The TCC state sensor 90 may generate a TCC state signal 90a according to the state $S_{TCC}$.

The torque converter 68 may provide a damping effect when the TCC 76 is in a SLIP state. A differential speed exists between the torque converter clutch plate 76a and the housing 78, and between the pump 72 and turbine 74 when the TCC 76 is slipping. The differential speed allows friction in the TCC 76 and hydraulic coupling between the pump 72 and turbine 74 to be present. The friction and hydraulic coupling may produce a damping torque that reduces a magnitude of the torque transient before transmission to the driveline 20. The damping reduces a magnitude of a torque transient generated by the engine 12 before transmission to the driveline 20.

On the other hand, when the TCC 76 is in a LOCKED state, the pump 72 and the turbine 74 may be rotating at the same speed and/or the differential speed between the pump 72 and the turbine 74 may be equal to zero. There may not be a hydraulic coupling in the torque converter or friction in the TCC 76 when the TCC 76 is in a LOCKED state. Torque transient generated by the engine may be transmitted to the driveline when the TCC 76 is in a LOCKED state.

The state of the TCC 76 may be controlled by pressures on two sides of the TCC 76, referred to as a front chamber 92 and a rear chamber 94. The TCC 76 may be locked by a pressure decrease at the front chamber 92 and/or by a pressure increase at the rear chamber 94. A differential speed between the pump 72 and the turbine 74 may be controlled via respective pressures at the front chamber 92 and the rear chamber 94 when the TCC 76 is in a SLIP state. The differential speed may determine a slip of the TCC 76. The slip may be controlled by a TCC valve 96 that regulates pressure in the front chamber 92 and in the rear chamber 94. The TCC valve 96 may regulate TCC chamber pressures via hydraulic control lines 92a and 94a for the front and rear chambers, respectively.

The engine control module (ECM) 16 controls the engine 12. The ECM 16 may include a VVL module 22, a torque module 98 and a time module 100. The VVL module 22 may determine a valve lift state $S_{VL}$ for controlling intake cam profile. The valve lift state $S_{VL}$ may include a first lift state $S_I$ and a second lift state $S_{II}$. The VVL module 22 may generate a valve lift signal 62 according to the valve lift state $S_{VL}$. The torque module 98 and the time module 100 may respond to a transition of valve lift state change, and generate control signals 102 to reduce a magnitude of a torque transient caused by the transition. The ECM 16 may transmit control signals 102 to the TCM 18 to generate a damping torque in the transmission 14.

The TCM 18 may include a damping control module 104 and a clutch slip control module 106. The damping control module 104 receives the control signals 102 from the ECM 16. The damping control module 104 may generate a clutch control signal when an engine torque transient occurs due to a valve lift state transition between a first lift state $S_I$ and a second lift state $S_{II}$. The clutch slip control module 106 may generate a valve control signal 108 for the TCC valve 96 according to a slip command signal generated by the damping control module 104.

Figure 2:
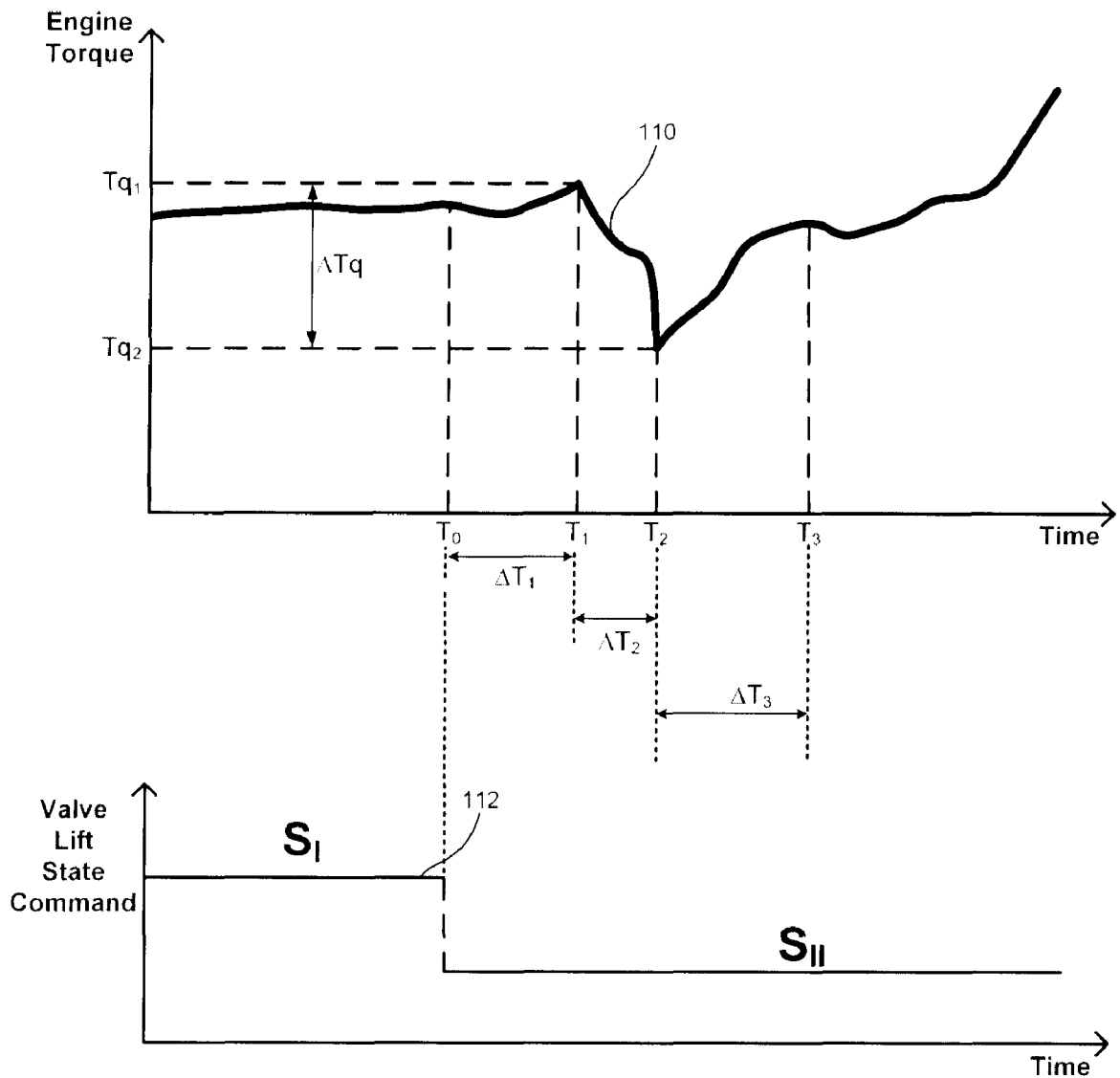
FIG. 2 is a plot of an engine torque signal and a valve lift state command signal.

In FIG. 2, a plot of an exemplary engine torque signal 110 and a valve lift state command signal 112 are shown. The plot illustrates changes in engine torque due to a transition of the valve lift state command signal 112. A change in valve lift state may occur at a commanded transition time $T_0$. The command change may take effect at an actual transition time $T_1$ that is after the commanded transition time $T_0$ due to actuator dynamic response to the valve lift state transition signal. The change in valve lift state may occur at a transition complete time $T_2$ that is after the actual transition time $T_1$. In one embodiment, the engine torque may settle to a determined level at a transition settle time $T_3$ that is after the transition complete time $T_2$.

A transition response period $\Delta T_1$ may be determined between the commanded transition time $T_0$ and the actual transition time $T_1$. A transition completion period $\Delta T_2$ may be determined between the actual transition time $T_1$ and the transition complete time $T_2$. A transition settling period $\Delta T_3$ may be recognized between the transition complete time $T_2$ and the transition settle time $T_3$.

Transition in valve lift state of an engine may cause a torque change, as illustrated in the torque signal 110. Before the valve lift state change actually takes effect at the actual transition time $T_1$, the engine may produce a torque according to a first lift state. This torque may be referred to as pre-transition torque $T_{q1}$. After the valve lift state has completed change at the transition complete time $T_2$, the engine may produce a torque according to a second lift state. This torque may be referred to as post-transition torque $T_{q2}$.

The pre-transition torque $T_{q1}$ before the valve lift state transition may be determined. In one embodiment, the pre-transition torque $T_{q1}$ may be measured at the commanded transition time $T_0$. In the other embodiment, the pre-transition torque $T_{q1}$ may be estimated at a time between the commanded transition time $T_0$ and the actual transition time $T_1$. The pre-transition torque $T_{q1}$ may be estimated using an engine torque model. A valve lift state prior to the transition, for example, the first valve lift state $S_I$, may be used as one parameter of the engine torque model.

The post-transition torque $T_{q2}$ after completion of the valve lift state transition may be determined. In one embodiment, the post-transition torque $T_{q2}$ may be estimated at the actual transition time $T_1$. In the other embodiment, the post-transition torque $T_{q2}$ may be estimated at a time between the commanded transition time $T_0$ and the transition complete time $T_2$. The post-transition torque $T_{q2}$ may be estimated using an engine torque model. A valve list state after the transition, for example, the second valve lift state $S_{II}$, may be used as one parameter of the engine torque model.

A torque difference $\Delta T_q$ between the pre-transition torque $T_{q1}$ and the post-transition torque $T_{q2}$ may be determined. A magnitude of the torque difference $\Delta T_q$ may be determined. A torque transient $T_T$ may be determined based on the magnitude of the torque difference $\Delta T_q$.

Figure 3:
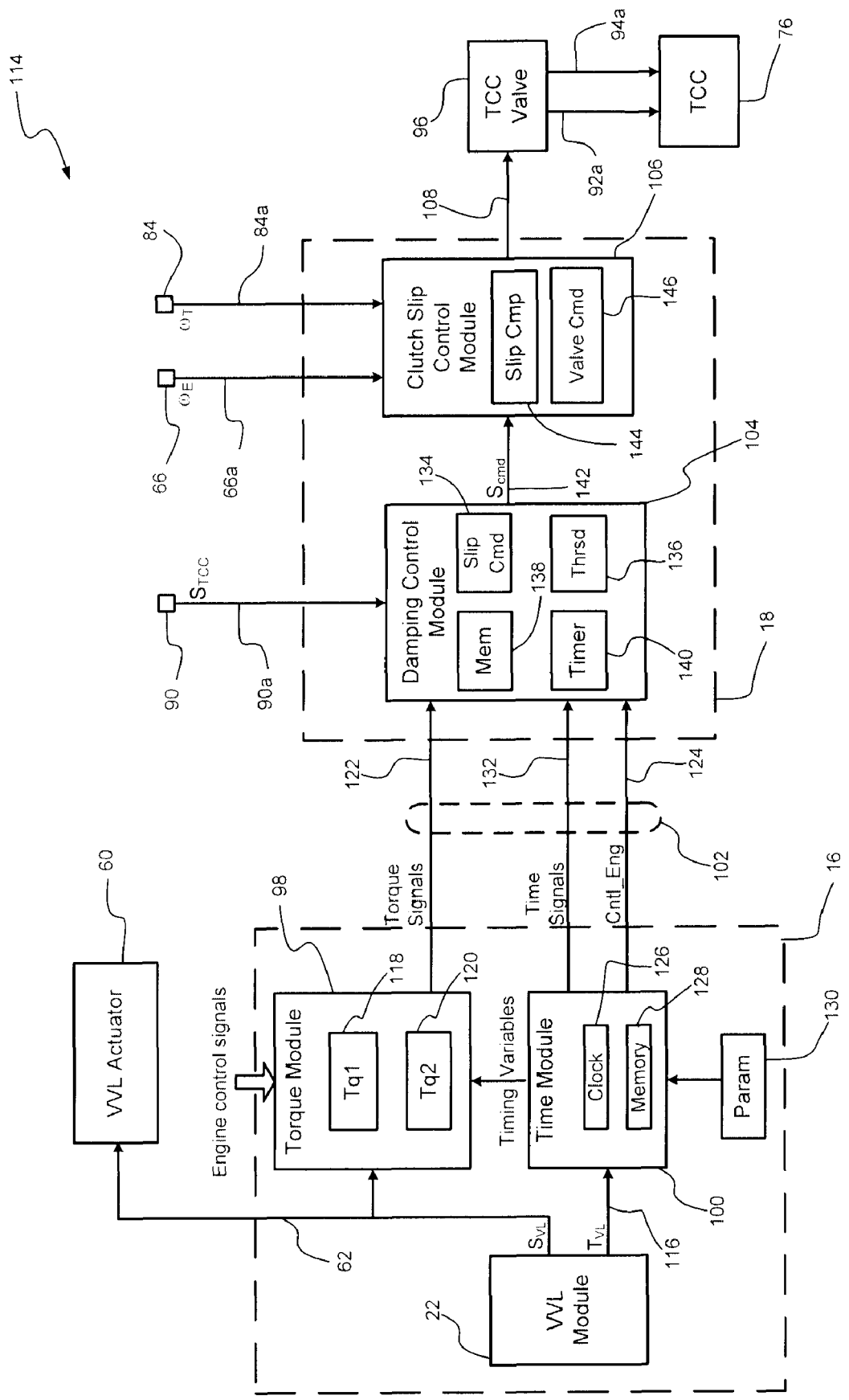
FIG. 3 is a functional block diagram of a coordination control system according to the principles of the present disclosure.

Referring now also to FIG. 3, a functional block diagram is illustrated to show a coordination control system. The coordination control system 114 may include the ECM 16 and the TCM 18. The coordination control system 114 may also include the engine speed sensor 66, the turbine speed sensor 84 and the TCC state sensor 90. The coordination control system 114 generates a control signal to the transmission TCC valve 96 based on a valve lift state transition of an engine.

The ECM 16 may include the VVL module 22 of FIG. 1, a torque module 98 and a time module 100. The VVL module 22 may determine a scheduled command of valve lift state $S_{VL}$ for engine operation. The scheduled command may be one of a first lift state $S_I$ and a second lift state $S_{II}$. The scheduled command may include a scheduled transition time $T_{VL}$. A command transition, for example, from the first lift state $S_I$ to the second lift state $S_{II}$ may occur at the scheduled transition time $T_{VL}$. A valve lift signal 62 may be generated according to the valve lift state $S_{VL}$. The valve lift signal 62 may be sent to the valve lift actuator 60 and the torque module 98. A transition time signal 116 may be generated according to the scheduled transition time $T_{VL}$ of the valve lift state. The transition time signal 116 may be transmitted to the time module 100.

The torque module 98 may include a pre-transition torque module 118 that determines the pre-transition torque $T_{q1}$ that is generated by the engine before the valve lift state transition. The torque module 98 may also include a post-transition torque module 120 that determines the post-transition torque $T_{q2}$ that is generated by the engine after the valve lift state transition is complete. The torque module 98 may also determine a torque difference $\Delta T_q$ between the pre-transition torque $T_{q1}$ and the post-transition torque $T_{q2}$. The torque module 98 may determine the pre-transition torque $T_{q1}$ and the post-transition torque $T_{q2}$ using an engine torque module.

The torque module 98 may determine a torque transient $T_T$ corresponding to a transition of valve lift state. The torque transient $T_T$ may be determined based on a magnitude of the torque difference $\Delta T_q$. The torque module 98 may generate torque signals 122 and send to the damping control module 104. The torque signals 122 may include the pre-transition torque $T_{q1}$, the post-transition torque $T_{q2}$, the torque difference $\Delta T_q$ and the torque transient $T_T$.

The torque module 98 may determine the pre-transition torque $T_{q1}$ and the post-transition torque $T_{q2}$ based on engine torque models. An exemplary engine torque model is disclosed in U.S. patent application Ser. No. 11/769,797 filed on Jun. 28, 2007. Engine control signals pertaining to the engine torque model may be provided to the torque module 98 for determining the pre-transition torque $T_{q1}$ and the post-transition torque $T_{q2}$.

The torque difference $\Delta T_q$ may be determined based on the pre-transition torque $T_{q1}$ and the post-transition torque $T_{q2}$, for example, using equation 1, $$\Delta T_q = T_{q1} - T_{q2} \quad (1)$$

A torque difference may also be characterized by a magnitude without indicating an order between $T_{q1}$ and $T_{q2}$ for providing a damping in the transmission.

The torque transient $T_T$ corresponding to the transition of valve lift state may be determined based on the torque difference $\Delta T_q$. In one embodiment, the torque transient $T_T$ is characterized based on a magnitude of the torque difference $\Delta T_q$ according to equation 2.

$$T_T = |\Delta T_q| \quad (2)$$

In another embodiment, the torque transient $T_T$ may be characterized based on the transition completion period $\Delta T_2$ in conjunction with the torque difference $\Delta T_q$, and determined, for example, using equation 3.

$$T_T = \left| \frac{\Delta T_q}{\Delta T_2} \right| \quad (3)$$

Yet, in the other embodiment, the torque transient is characterized based on the transition completion period $\Delta T_2$ and the transition settling period $\Delta T_3$ in conjunction with the torque difference $\Delta T_q$ according to equation 4.

$$T_T = \left| \frac{\Delta T_q}{\Delta T_2 + \Delta T_3} \right| \quad (4)$$

The time module 100 detects a transition of the valve lift state command $S_{VL}$ and sets an engine control flag Cntl_Eng. The engine control flag Cntl_Eng is set when a transition of valve lift state command is detected; otherwise Cntl_Eng is reset. An engine control flag signal 124 may be generated according to the engine control flag Cntl_Eng. The engine control flag signal 124 may be sent to the damping control module 104. A system clock may be recorded in a clock module 126 to indicate a time of the transition.

The time module 100 may include a memory module 128. The memory module 128 may be used to store various timing variables. The timing variables may include a transition response period $\Delta T_1$, a transition completion period $\Delta T_2$ and a transition settling period $\Delta T_3$. The time module 100 may determine $\Delta T_1$, $\Delta T_2$ and $\Delta T_3$ based on engine parameters provided by a parameter module 130. The timing variables may also be sent to the torque module 98 for determining the torque transient $T_T$.

The time module 100 may generate time signals 132 and send to the damping control module 104. The time signals 132 may include the transition response period $\Delta T_1$, the transition completion period $\Delta T_2$, the transition settling period $\Delta T_3$ and the scheduled transition time $T_{VL}$ of valve lift state. The time signal may also include contents of the clock 126 and memory 128.

The TCM 18 may include a damping control module 104 and a clutch slip control module 106. The damping control module 104 may receive the engine control flag signal 124, the torque signals 122 and the time signals 132. The damping control module 104 may also receive a TCC state $S_{TCC}$ from the TCC state signal 90a. The TCC state $S_{TCC}$ may be used to determine a slip command. The damping control module 104 may include a slip command module 134 that determines a clutch slip command based on the engine control flag signal 124 that indicates a transition of valve lift state.

The damping control module 104 may also include a control threshold module 136 that determines control thresholds for use by the slip command module 134. The damping control module 104 may include a memory 138 that stores a time variable for clutch slip control. The time variable may be a control ending time $T_{end}$ to indicate a time to terminate a clutch slip control. The damping control module 104 may also include a timer module 140 that monitors a progress of clutch slip control based on the time signals 132. The damping control module 104 may generate a slip command signal 142 according to the slip command $S_{cmd}$. The slip command signal 142 may be sent to the clutch control module 106 for clutch regulation control to provide damping in the transmission.

The clutch slip control module 106 may control a slip of the TCC 76 based on a slip command $S_{cmd}$ generated by the damping control module 104. The slip of the TCC 76 may provide damping to reduce a torque transient corresponding to a transition of valve lift state. The clutch slip control module 106 may include a slip computation module 144 that determines a slip of the TCC 76. The slip may be determined based on the engine speed signal 66*a* and the turbine speed signal 84*a*. The clutch slip control module 106 may also include a valve command module 146 that generates a valve control signal 108 to control the TCC valve 96. The TCC valve 96 may regulate pressures of TCC chambers via two hydraulic control lines 92*a* and 94*a*. The valve command may include a pressure increase command and a pressure decrease command.

Figure 4:
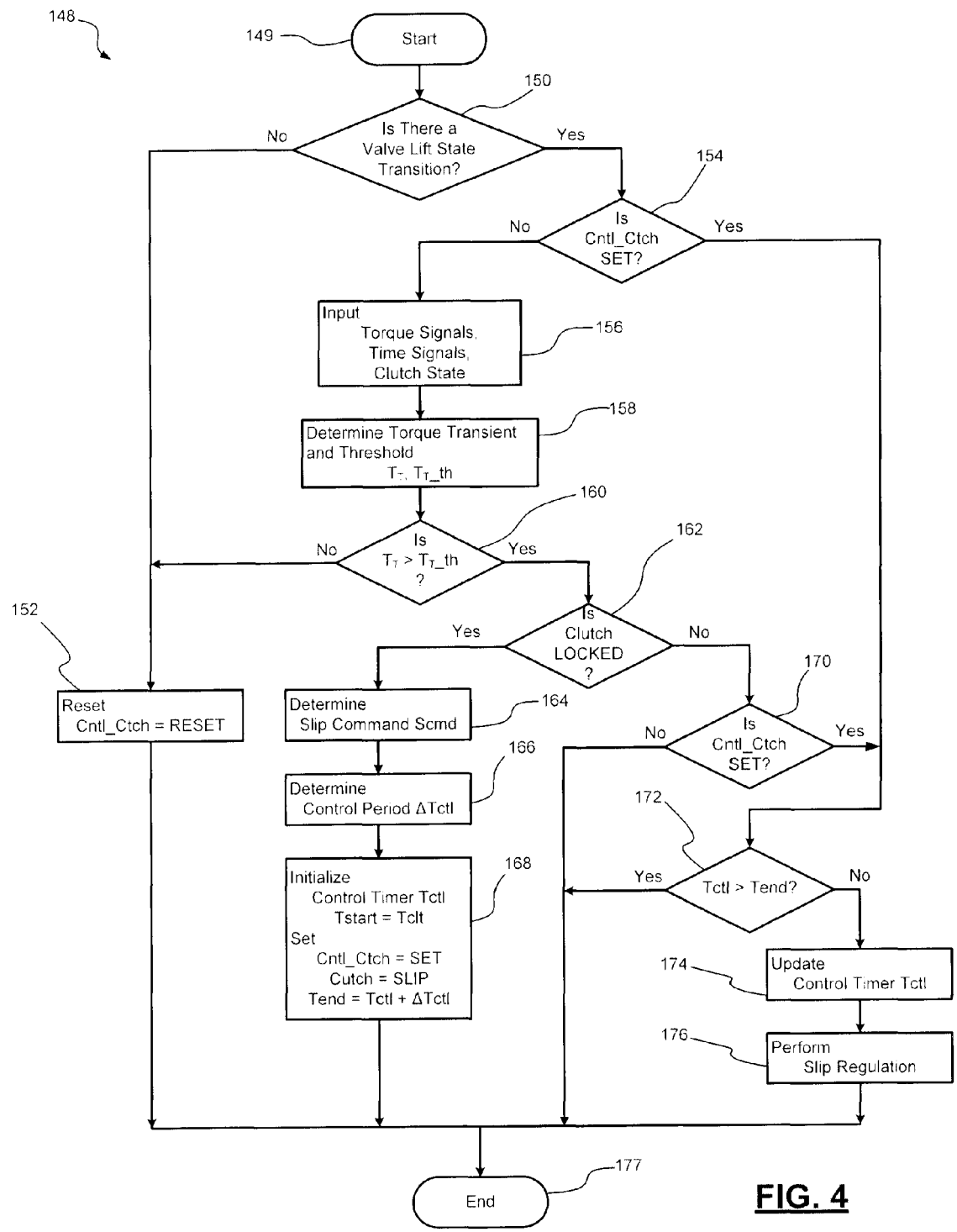
FIG. 4 illustrates an exemplary method of providing clutch slip in a transmission according to the principles of the present disclosure.

FIG. 4 illustrates an exemplary method 148 for generating a damping in the transmission. Control of the damping control module 104 may execute steps associated with the method 148.

In step 150, the damping control module 104 detects an occurrence of a valve lift state command transition, for example, from a valve lift state command of a first lift state $S_I$ to a second lift state $S_{II}$. The damping control module 104 may detect the occurrence based on an engine control flag Cntl_Eng. The flag Cntl_Eng may be in one of a SET and a RESET state. The damping control module 104 may obtain the engine control flag Cntl_Eng via the engine control flag signal 124. The control proceeds to step 152 to reset a clutch control flag Cntl_Ctch when a transition in a valve lift state is not detected (i.e., the valve does not transition between lift states); i.e., when Cntl_Eng is in a RESET state.

In step 154, the control proceeds to detect whether a clutch control is already in progress when Cntl_Eng is detected to be in SET state in step 150. The damping control module 104 reads a clutch control flag Cntl_Ctch. The clutch control flag Cntl_Ctch may be in one of a SET and a RESET state. The control proceeds to step 156 when clutch control is disabled, i.e., when the clutch control flag Cntl_Ctch is in a RESET state.

In step 156, the damping control module 104 reads the torque signals 122 and the time signals 132 respectively provided by the torque module 98 and the time module 100. The damping control module 104 also reads the TCC state signal 90*a* to obtain the TCC state $S_{TCC}$.

In step 158, the damping control module 104 may determine a torque transient $T_T$ based on the torque signals and the time signals. The damping control module 104 may use one of the equations 1, 2, 3 and 4 to determine the torque transient $T_T$. The damping control module 104 may also use a torque transient determined by the torque module 98, and indicated via the torque signals 122. The damping control module 104 may also determine a threshold for torque transient $\Delta T_{q\_th}$. In one embodiment, the threshold $\Delta T_{q\_th}$ may be a fixed parameter obtained from a calibration parameter set. In another embodiment, the threshold $\Delta T_{q\_th}$ may be determined by the control threshold module 136 based on an engine torque level. For example, the threshold $\Delta T_{q\_th}$ may be determined based on the pre-transition torque $T_{q1}$, the post-transition torque $T_{q2}$, or the combination of $T_{q1}$ and $T_{q2}$. For illustrative purpose only, in step 158, a torque difference $\Delta T_q$ is used to represent the torque transient for the method 148. A magnitude of $\Delta T_q$ may also be used in step 158.

In step 160, the damping control module 104 compares a torque transient represented by $\Delta T_q$ and a threshold $\Delta T_{q\_th}$. The method 148 proceeds to step 152 to reset the clutch control flag Cntl_Ctch when the torque transient is less than the threshold $\Delta T_{q\_th}$. Clutch control is not performed when the torque transient is less than the threshold.

In step 162, the damping control module 104 detects a clutch state. The clutch state may be one of a LOCKED state and a SLIP state. The damping control module 104 may detect the clutch state based on the TCC state signal 90*a*. The method 148 proceeds to step 164 when the TCC state is LOCKED. In this case, the method 148 will cause a slip in the clutch to generate damping in the transmission.

Figure 5:
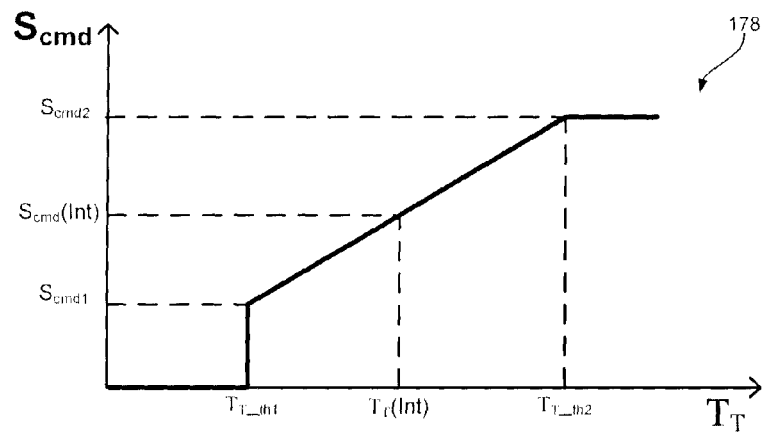
FIG. 5 illustrates an exemplary method of generating a slip command signal according to the principles of the present disclosure.

In step 164, the damping control module 104 determines a slip command $S_{cmd}$ for clutch control. The slip command module 134 may generate a slip command based on the torque transient and threshold, for example, as illustrated in FIG. 5.

In step 166, a control period $\Delta T_{ctl}$ to perform the clutch control is determined. In one embodiment, the control period $\Delta T_{ctl}$ may be determined based on a transition response period $\Delta T_1$ and a transition completion period $\Delta T_2$, for example, using equation 5, $$\Delta T_{cntl} = \Delta T_1 + \Delta T_2 \qquad (5)$$

In the other embodiment, the control period may be determined based on a transition response period $\Delta T_1$, a transition completion period $\Delta T_2$ and a transition settling period $\Delta T_3$, for example, using equation 6, $$\Delta T_{cntl} = \Delta T_1 + \Delta T_2 + \Delta T_3 \qquad (6)$$

In step 168, the damping control module 104 prepares to perform a control of clutch slip regulation by initializing a timer for a clutch control time $T_{ctl}$, setting the clutch control flag Cntl_Ctch to SET state and setting the TCC state to SLIP state. Timer 140 may be used to monitor the clutch control time $T_{ctl}$. A starting time $T_{start}$ may be initialized to equal the clutch control time Tctl in step 168. The starting time $T_{start}$ may be stored in memory 138 of the damping control module 104. In one embodiment, the control time $T_{ctl}$ may be recorded according to a system clock. In another embodiment, the control time $T_{ctl}$ may be set based on the commanded transition time $T_0$ provided by the time module 100.

A control ending time $T_{end}$ may be determined based on the starting time $T_{start}$ and a control period $\Delta T_{ctl}$. The control ending time $T_{end}$ may be stored in memory 138 in the damping control module 104. The control ending time $T_{end}$ may be determined, for example, using equation 7, $$\Delta T_{end} = T_{start} + \Delta T_{ctl} \qquad (7)$$

In step 170, the damping control module 104 determines whether there is an existing clutch control activity in progress when the TCC state is not LOCKED in step 162. An existing clutch control activity is in progress when the flag Cntl_Ctch is SET. The method 148 proceeds to step 172 and continue to execute clutch control when the flag Cntl_Ctch is SET.

In step 172, the damping control module 104 compares the control time $T_{ctl}$ in timer 140 with the ending time $T_{end}$ in memory 138. The method 148 proceeds to exit when the control time $T_{ctl}$ has exceeded the ending time $T_{end}$. The damping control module 104 updates the control time $T_{ctl}$ in timer 140 according to a system clock in step 174, and continues to perform clutch slip regulation in step 176 when the control time $T_{ctl}$ does not exceed the ending time $T_{end}$ in step 172. The clutch slip regulation may be performed by the clutch slip control module 106.

In step 176, the method 148 may generate a damping in the transmission 14 by allowing the TCC 76 to slip when the control time $T_{ctl}$ is less than the ending time $T_{end}$. In one embodiment, slip regulation may be performed by generating a slip command signal and regulating a clutch slip of the TCC 76 based on the slip command signal. In another embodiment, the state of the TCC 76 may be changed from LOCKED to SLIP without regulating the slip of the TCC 76 to a specific slip command.

FIG. 5 illustrates an example method 178 for determining a clutch slip command $S_{cmd}$. The clutch slip command $S_{cmd}$ is determined based on torque transient $T_T$. The clutch slip command $S_{cmd}$ may be determined based on one or more threshold(s). In the method 178, the slip command $S_{cmd}$ is generated when the torque transient $T_T$ exceeds a first threshold $T_{T\_th1}$. A first clutch slip $S_{cmd1}$ may be commanded when the torque transient $T_T$ reaches the first threshold $T_{T\_th1}$. A second clutch slip $S_{cmd2}$ may be commanded when the torque transient $T_T$ is greater than or equal to a second threshold $T_{T\_th2}$ that is greater than the first threshold $T_{T\_th2}$. Interpolation between slips $S_{cmd1}$ and $S_{cmd2}$ may be used to determine a clutch slip command when the torque transient is greater than the first threshold $T_{T\_th1}$ and less than the second threshold $T_{T\_th2}$. For example, an interpolated slip $S_{cmd}$(Int) may be commanded when the torque transient has a value of $T_T$(Int).

The plot of FIG. 5 is provided for example only. For example, although the second clutch slip is shown as being $S_{cmd2}$ greater than the first clutch slip $S_{cmd1}$, as an alternative that second clutch slip $S_{cmd2}$ may be less than or equal to the first clutch slip $S_{cmd1}$.

Figure 6:
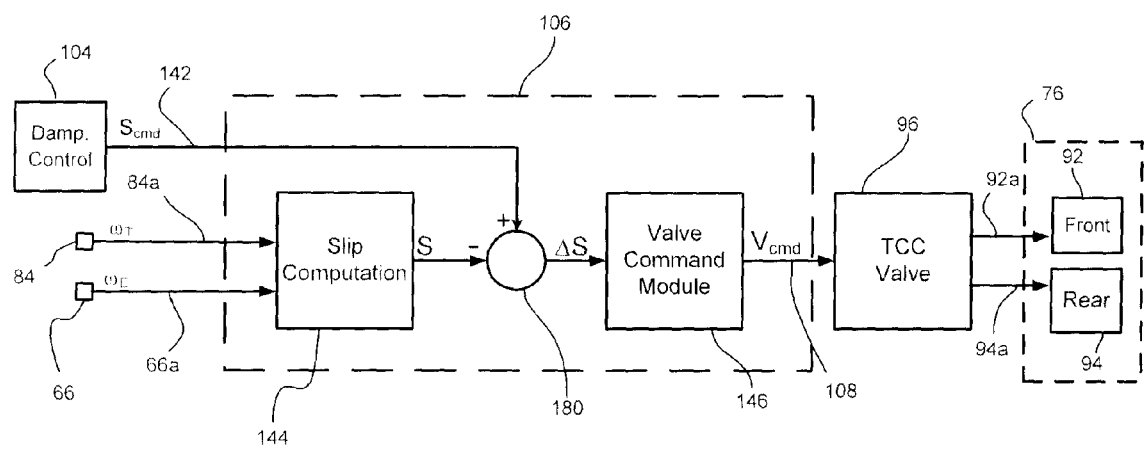
FIG. 6 is a functional block diagram of a clutch slip control module according to the principles of the present disclosure.

Referring now to FIG. 6, a functional block diagram of an exemplary clutch slip control module 106 is shown. The clutch slip control module 106 performs clutch slip regulation based on the slip command signal $S_{cmd}$ generated by the damping control module 104. The clutch slip control module 106 may include a slip computation module 144 and a valve command module 146. The slip computation module 144 receives the engine speed signal 66a and the turbine speed signal 84a to determine a clutch slip S of the TCC 76. The clutch slip may be determined, for example, using equation 8, $$S = \frac{\omega_E - \omega_T}{\omega_E} \quad (8)$$

The clutch slip control module 106 may use a differentiator module 180 to determine a slip difference ΔS. The slip difference ΔS may be determined based on the slip command signal 142 received from the damping control module 104 and the clutch slip S computed by the slip computation module 144. The slip difference ΔS may be determined, for example, using equation 9, $$\Delta S = S_{cmd} - S \quad (9)$$

The slip difference ΔS may be used by the valve command module 146 to generate a valve command $V_{cmd}$ for the TCC valve 96. The valve command $V_{cmd}$ may include a pressure increase command, a pressure decrease command and a pressure hold command. A valve control signal 108 may be generated according to the valve command $V_{cmd}$. For illustrative purpose only, a command of pressure increase may cause a hydraulic pressure increase at the rear chamber 94 of the TCC 76, and/or a hydraulic pressure decrease at the front chamber 92. A command of pressure decrease may cause a hydraulic pressure decrease at the rear chamber 94 of the TCC 76, and/or a pressure increase at the front chamber 92. A pressure hold command may maintain a pressure at the front chamber 92 and the rear chamber 94. The TCC valve 96 may perform pressure increase or decrease of the TCC 76 via hydraulic control lines 92a and/or 94a, severally or jointly.

The valve command module 146 may determine the valve command $V_{cmd}$, based on a valve switching index $V_s$. The valve switching index $V_s$ may be generated, for example, using equation 10, $$V_s = \Delta S + K \frac{d(\Delta S)}{dt} \quad (10)$$

K is a calibration constant, for example, having a value of 0.3.

The valve command module 146 may generate the valve command $V_{cmd}$ based on the valve switching index $V_s$, for example, using equation 11, $V_{cmd}$=Pressure increase if $V_s$<−ε

$V_{cmd}$=Pressure decrease if $V_s$>ε

$V_{cmd}$=Pressure hold if |$V_s$|<ε       (11)

ε is a calibration parameter, for example, having a value of 0.01. The valve command $V_{cmd}$ may be sent to the TCC valve 96 via a valve control signal 108.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a powertrain of a vehicle comprising:
   a torque module that:
      determines a first output torque of an engine,
      determines a second output torque of the engine after determining the first output torque, and
      determines a torque difference based on the first output torque and the second output torque; and
   a damping control module that controls operation of a clutch to generate a damping torque in a transmission based on the torque difference.

2. The control system of claim 1, wherein the damping control module further detects a state of the clutch of the transmission and slips the clutch when the clutch is in a locked state,
   wherein the clutch operates in one of the locked state and a slip state.

3. The control system of claim 2, wherein the clutch is a torque converter clutch.

4. The control system of claim 2, wherein the damping control module further determines a magnitude of the torque difference and operates the clutch in the slip state based on the magnitude.

5. The control system of claim 4, wherein the damping control module operates the clutch in the slip state and controls slip of the clutch based on the magnitude.

6. The control system of claim 5, wherein the damping control module generates a slip command signal when the magnitude exceeds a torque threshold.

7. The control system of claim 1, wherein the determining of the second output torque comprises estimating the second output torque based on a model of engine torque.

8. A control system for a powertrain of a vehicle comprising:
   a time module that detects a transition from a first lift state to a second lift state of a valve of an engine of the vehicle;
   a torque module that determines a torque difference based on the transition; and a damping control module that:
  detects a state of a clutch in a transmission, wherein the clutch operates in one of a locked state and a slip state, and
  changes the state of the clutch to the slip state based on the torque difference when the state of the clutch is the locked state.

9. The control system of claim 8, wherein the clutch is a torque converter clutch.

10. The control of claim 8, wherein the torque module determines a first torque of the engine before the transition based on the first lift state, determines a second torque of the engine after the transition based on the second lift state, and determines the torque difference based on a difference between the first torque and the second torque.

11. The control system of claim 10, wherein at least one of the first torque and the second torque is determined based on a model of engine torque.

12. The control system of claim 8, wherein the damping control module further determines a magnitude of the torque difference and changes the state of the clutch to the slip state based on the magnitude.

13. The control system of claim 12, wherein the damping control module further generates a slip command signal when the magnitude exceeds a torque threshold, and controls a slip of the clutch based on the slip command signal.

14. A method of operating a powertrain system comprising:
  detecting a transition from a first lift state to a second lift state of a valve of an engine;
  determining a torque difference based on the transition;
  detecting a state of a clutch in a transmission, wherein the clutch operates in one of a locked state and a slip state; and
  slipping the clutch based on the torque difference when the clutch is in the locked state.

15. The method of claim 14, wherein the clutch is a torque converter clutch.

16. The method of claim 14, wherein the determining of the torque difference comprises:
  determining a first torque of the engine before the transition based on the first lift state;
  determining a second torque of the engine after the transition based on the second lift state; and
  determining the torque difference based on a difference between the first torque and the second torque.

17. The method of claim 16, wherein at least one of the first torque and the second torque is determined based on a model of engine torque.

18. The method of claim 14, wherein the slipping of the clutch comprises:
  determining a magnitude of the torque difference; and
  changing the state of the clutch to the slip state based on the magnitude.

19. The method of claim 18, wherein the changing of the state comprises:
  generating a slip command signal based on the magnitude; and
  controlling a slip of the clutch based on the slip command signal.

20. The method of claim 19, wherein the slip command signal is generated when the magnitude exceeds a torque threshold.

* * * * *